United States Patent Office 3,201,463
Patented Aug. 17, 1965

3,201,463
PREPARATION OF N,N'-DICYCLOHEXYL
CARBODIIMIDE
William R. Ruby, Rensselaer, N.Y., assignor to General
Aniline & Film Corporation, New York, N.Y., a corporation of Delaware
No Drawing.  Filed Feb. 26, 1962, Ser. No. 175,807
12 Claims.  (Cl. 260—551)

This invention relates to an improved method for preparing carbodiimides.

Carbodiimides are known chemical compounds and are useful intermediates in the chemical field and related arts. Carbodiimides have been found particularly valuable in the realm of photography where they are used to prepare modified gelatins.

One method (disclosed in U.S. Patent 2,415,043 to John B. Rust) for the production of N,N'-disubstituted thiourea with heavy metal oxides or carbonates such as mercuric oxide (HgO), lead oxide (PbO), lead carbonate (PbCO$_3$) and the like. In the ensuing reaction the elements of hydrogen sulfide are abstracted from the thiourea, resulting in the formation of the corresponding carbodiimide. A serious drawback, however, to this process (see for example U.S. Patent 2,656,383 to E. Schmidt et al., U.S. Patent 2,942,025 to R. F. Coles et al., and U.S. Patent 2,946,819 to R. F. Coles) can be attributed to the inconsistent results which are often obtained. Furthermore, it is necessary to use considerable exces of heavy metal oxide or carbonate which adds to the cost of operation .

I have now found a method of modifying this process wherein not only are higher yields obtained, but such higher yields are obtained quite consistently, i.e. yields of 85 to 98%, while using approximately theoretical amounts of reactants.

These improved results are obtained by reacting in an inert solvent an N,N'-disubstituted thiourea with lead oxide (litharge) in the presence of an alkali metal halide and preferably, but not essentially, in the presence of a catalytic amount of sulfur.

The N,N'-disubstituted carbodiimides prepared in accordance with the present invention can be represented by the following general formula:

$$A-N=C=N-B$$

wherein A and B, which may be alike or different, represent organic radicals such as an aliphatic radical, i.e. alkyl, e.g., methyl, ethyl, propyl, isopropyl, n-butyl, isobutyl, tert.-butyl, allyl, crotyl, β-hydroxyethyl, β-dimethylaminopropyl, β-bromoallyl, and the like; an alicyclic radical, e.g., cyclopropyl, cyclobutyl, cyclopentyl, cyclohexyl, cycloheptyl, cyclooctyl, cyclononyl, cyclodeyl, and the like.

The N,N'-disubstituted thioureas used as intermediates for the preparation of the corresponding N,N'-disubstituted carbodiimides as herein described can be represented by the following general formula:

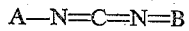

wherein A and B have the values given above.

In the following list are typified N,N'-disubstituted thioureas which may be employed for the purpose herein set forth:

N-methyl-N'-tert.-butylthiourea
N,N'-diisopropylthiourea
N,N'-dicyclohexylthiourea
N,N'-ditert.-butylthiourea
N-cyclohexyl-N'-tert.-butylthiourea
N,N'-dibutylthiourea
N,N'-diisobutylthiourea
N,N'-diallylthiourea
N-allyl-N'-cyclohexylthiourea
N-crotyl-N'-cyclohexylthiourea
N-allyl-N'-(β-hydroxyethyl)thiourea
N-methyl-N'-propylthiourea
N-propyl-N'-tert.-butylthiourea
N-isopropyl-N'-tert.-butylthiourea
N-(α-dimethylaminopropyl)-N'-tert.-butylthiourea
N-(β-bromoallyl)-N'-propylthiourea
N-(β-bromoallyl)-N'-isopropylthiourea
N-(β-bromoallyl)-N'-tert.-butylthiourea
N-(α-dimethylaminopropyl)-N'-(β-bromoallyl)thiourea The reaction of the present invention is carried out in an inert liquid solvent or medium such as aromatic hydrocarbons, halogenated aromatic and aliphatic hydrocarbons, aliphatic ethers, cyclic ethers, and the like. Typical solvents are the following:

| | |
|---|---|
| Chloroform | Dioxane |
| Benzene | Chlorinated benzene |
| Toluene | Aliphatic ethers |
| Xylene | |

The solvent employed for carrying out the reaction of the present invention is preferably one which refluxes at the desired temperature of reaction, i.e. within the range of about 65 to 75° C. and my preferred solvent is benzene-water azeotrope in which the proportions of benzene and water is approximately 3:2 by weight, i.e. such that the reflux temperature of the reaction mass is within the range of about 65 to 75° C.

In brief, the process of the present invention comprises treating one part of N,N'-disubstituted thiourea with at least an equivalent amount, preferably a slight excess (up to about 10% excess) of lead oxide in the presence of a small amount of an alkali metal halide, i.e. about ¼ to ½ the equivalent of the N,N'-disubstituted thiourea in an inert liquid solvent at a temperature within the range of about 65 to 75° C. I have also found it to be quite advantageous to have present a small (catalytic) amount of sulfur during the reaction since the presence of sulfur during the reaction has been found to substantially improve the rate of filtration obtained when the reaction mixture is filtered on completion of the reaction. The presence or absence of sulfur, however, appears to be without affect on the rate of reaction, or the yield which is obtained.

Details of the present invention will be apparent on consideration of the following specific examples of preferred embodiments thereof, but it is to be understood that such examples are given by way of illustration only and are not to be taken as limiting the invention.

*Example 1*

60 g. (.25 mol) of N,N'-dicyclohexylthiourea is combined with 60 g. (.628 mol) of lead oxide, 0.2 g. of sulfur, 4.6 g. of salt, 200 cc. of water and 300 cc. of benzene. The mixture is heated to reflux (approx. 70° C.) in 20 minutes and maintained at that temperature with stirring for 7½ hours. All material is washed onto a filter with hot water and filtered. The filter cake is washed with benzene (50 cc. eight times). The mother liquor and the wash liquor are combined, and allowed to stand overnight in the refrigerator. Practically no dicyclohexylthiourea precipitated. The benzene layer is separated.

Volatiles are distilled off at a temperature up to 125° C. under a 28" vacuum. Then the charge is distilled at a temperature of 133–134° C. over a period of about 12 minutes, the vapor pressure being 2-3 mm. 48.6 of N,N'-dicyclohexylcarbodiimide, a colorless water-clear liquid, is obtained (yield 94.5%) which solidifies on cooling.

Example 2

Into 200 cc. of water is slurried 60 g. of N,N'-dicyclohexylthiourea, 60 g. of lead oxide, 0.2 g. of sulfur flowers, 4.6 g. of salt and 200 cc. of benzene. It is heated to reflux (71° C.) in 12 minutes, and held at the reflux for 7½ hours. It is filtered hot and the cake washed with 50 cc. of boiling benzene eight times. The benzene extract is dried over anhyd. sodium sulfate.

Volatiles are distilled off up to 120° C. and 80 mm. pressure. It is then distilled at 132–134° C. under 3 mm. pressure for 10 minutes. The colorless liquid, N,N'-dicyclohexylcarbodiimide thus recovered weights 45.3 g. (88.3% yield). It solidifies on cooling.

Example 3

Into 300 cc. of benzene is slurried 60 g. of N,N'-dicyclohexylthiourea, 60 g. of lead oxide, 0.2 g. of flowers of sulfur, and 4.6 g. of salt. 200 cc. of water is added and the charge heated to the reflux (70° C.) with stirring in 15 minutes. It is held at the reflux for 7¾ hours and filtered hot. That remaining is washed onto the filter with hot water. No crystallization of filtrate occurs on cooling to room temperature. The cake is washed with 50 cc. of benzene five times. The benzene layer is distilled up to 120° C. under atmospheric pressure, then under 28" vacuum to 120° C. It is then distilled at 134–140° C. under 4–5 mm. for 13 minutes. 49.2 g. of N,N'-dicyclohexylcarbodiimide (95.5% yield) is obtained as a colorless product which solidifies on cooling and has a pleasant odor.

Comparative Example 3A

In order to exemplify the criticality of salt in this reaction Example 3 was repeated exactly with the exception that the salt is omitted. On filtration at the end of the reflux period there is a lot of crystalline material mixed with the lead sulfide filter cake. After repeated benzene washes there is still considerable filter cake. Much material precipitates out of the filtrate on cooling. This material is filtered and ascertained to be N,N'-dicyclohexylthiourea.

It is concentrated and distilled as in Example 3 from 129–133° C. under 3.5 mm. pressure. The distillation stops and the distillate is turbid at the end of the distillation. Only 4.4 g. of product is produced which contains considerable solids and which does not solidify on standing. A black resinous mass is left in the distillation vessel.

Example 4

A slurry is made of 150 cc. of benzene, 30 g. of N,N'-dicyclohexylthiourea, 30 g. of lead oxide, 0.1 g. of flowers sulfur and 3.0 g. of potassium chloride. After stirring 5 minutes 100 cc. of water is added. The mixture is brought to reflux (71° C.) in 10 minutes and held at reflux 7½ hours. The reaction mix is filtered thru Celite (diatomaceous earth), washed with hot water and then 5 times with 25 cc. of hot benzene. The mother liquor is combined with the washes and allowed to cool, and then filtered. The benzene layer is dried over anhyd. sodium sulfate and filtered. The dried benzene extract is distilled up to 120° at atmospheric pressure and then under 28" vacuum at 120° C. It is then distilled at 127–14° C. under 2.5 mm. pressure for 17 minutes. N,N'-dicyclohexylcarbodiimide is obtained as a colorless liquid which crystallizes on cooling. The yield is 90.3%.

Example 5

A slurry is made up to 150 cc. of benzene, 30g. of N,N'-dicyclohexylthiourea, 30 g. of lead oxide, 0.1 g. of flowers of sulfur and 4.1 g. of sodium bromide. After stirring 5 minutes 100 cc. of water is added and the mixture is brought to reflux (71° C.) in 15 minutes and held at reflux for 7½ hours. It is worked up exactly as described in Example 5, the final distillation temperature ranging from 125–133° C. at about 2 mm. pressure over a period of 15 minutes. The thus produced colorless liquid N,N'-dicyclohexylcarbodiimide solidifies as usual on cooling. The yield is 90.5%.

Example 6

A slurry is made up of 150 cc. of benzene, 30 g. of N,N'-dicyclohexylthiourea, 30 g. of lead oxide, and 2.3 g. of salt. It is slurried 5 minutes and then 100 cc. of water is added. It is heated quickly to reflux with stirring and held at reflux for 7¾ hours. It is filtered hot thru a Celite bed. It is washed onto a filter with hot water and then with boiling benzene (25 cc. five times). It is cooled, the benzene layer separated, concentrated up to 115° C. at atmospheric pressure and then at 28" vacuum. The final distillation is at 123–127.5° C. at about 2 mm. pressure in a period of 15 minutes. A color liquid N,N'-dicyclohexylcarbodiimide is obtained which solidifies on cooling. The yield is 91%.

The difference between this experiment and those made employing sulfur is the difference in the speed of filtration. Without sulfur, the filtration is slower.

Example 7

Example 1 is repeated, except that 67 g. of N,N'-bis-(3-methylcyclohexyl) carbodiimide is obtained.

Example 8

To 310 cc. of benzene is added 50 g. (0.312 mol) of diisopropylthiourea, 75 g. of lead oxide, 250 mg. of sulfur, 250 cc. of water and 5.6 g. of salt. Under fast agitation the charge is brought quickly to reflux (about 72° C.) and held there for 7½ hrs. All material is washed onto a filter with hot water. The flask is washed out and the material on the filter washed 5 times with 40 cc. of hot benzene each time. The mother liquor and the wash liquor are combined and iced to cool. The small amount of diisopropylthiourea which precipitated is removed. The benzene layer is separated, and then distilled.

Volatiles are distilled off at atmospheric pressure. Then the charge is distilled at a temperature of about 144–144.8° C. at atmospheric pressure. The main cut, N,N'-diisopropylcarbodiimide, was a clear colorless liquid at room temperature.

Example 9

To 250 cc. of benzene is added 200 cc. of water, 64.2 g. of di-o-tolylthiourea, 60 g. of lead oxide, 200 mg. of sulfur and 4.6 g. of salt. Under fast agitation the charge is brought to reflux (about 72° C.) and held for 2 hours until a homogeneous dark gray to black slurry is formed. All material is washed onto a filter with hot water. The flask is washed out and the material on the filter washed 5 times using 50 c. of hot benzene each time. The mother liquor and the wash liquor are combined and iced to cool. The small amount of di-o-tolylthiourea which precipitated is removed. The benzene layer is separated, and then distilled.

Volatiles are distilled off under 4.5 mm. pressure. Then the charge is distilled at 169–174° C. under 4.5 mm. pressure. The main cut, N,N'-di-o-tolylcarbodiimide is a yellowish liquid which is liquid at room temperature. The wield is 90.6% of theory.

I claim:

1. A process of producing a carbodiimide of the following formula:

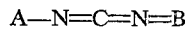

wherein A and B are selected from the class consisting of lower alkyl, lower cycloalkyl and phenyl which comprises reacting about 1 mole of a N,N'-disubstituted thiourea of the following formula:

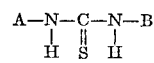

wherein A and B are selected from the class consisting of lower alkyl, lower cycloalkyl and phenyl with about 1 mole of lead dioxide at a temperature of about 65–75° C. in an inert liquid solvent and in the presence of about ¼ to ½ mole of an alkali metal halide, filtering the reaction mixture and isolating said carbodiimide from the reaction mixture by distillation.

2. The process as defined in claim 1 wherein the inert liquid solvent is a benzene-water azeotrope in the ratios of approximately 3:2 by weight.

3. The process as defined in claim 2 wherein the alkali metal halide is sodium chloride.

4. The process as defined in claim 1 wherein the N,N'-disubstituted thiourea is N,N'-dicyclohexylthiourea whereby N,N'-dicyclohexylcarbodiimide is obtained.

5. The process as defined in claim 2 wherin the N,N'-disubstituted thiourea is N,N'-dicyclohexylthiourea whereby N,N'-dicyclohexylcarbodiimide is obtained.

6. The process as defined in claim 3 wherein the N,N'-disubstituted thiourea is N,N'-dicyclohexylthiourea whereby N,N'-dicyclohexylcarbodiimide is obtained.

7. The process as defined in claim 1 wherein there is present during the reaction a small amount of elemental sulfur.

8. The process as defined in claim 2 wherein there is present during the reaction a small amount of elemental sulfur.

9. The process as defined in claim 3 wherein there is present during the reaction a small amount of elemental sulfur.

10. The process as defined in claim 4 wherein there is present during the reaction a small amount of elemental sulfur.

11. The process as defined in claim 5 wherein there is present during the reaction a small amount of elemental sulfur.

12. The process as defined in claim 6 wherein there is present during the reaction a small amount of elemental sulfur.

References Cited by the Examiner
UNITED STATES PATENTS

| | | | |
|---|---|---|---|
| 2,415,043 | 1/47 | Rust | 260—551 |
| 2,656,383 | 10/53 | Schmidt et al. | 260—551 |

OTHER REFERENCES

Schmidt et al.: Ber. Deut. Chem., volume 71, pages 1933 to 1938 (1938).

Zetzsche et al.: Ber. Deut. Chem., volume 71, pages 1512 to 1516 (1938).

Zetzsche et al.: Ber. Deut. Chem., volume 73, pages 467 to 477 (1940).

WALTER A. MODANCE, *Primary Examiner.*

IRVING MARCUS, JOHN D. RANDOLPH, NICHOLAS S. RIZZO, *Examiners.*

UNITED STATES PATENT OFFICE
CERTIFICATE OF CORRECTION

Patent No. 3,201,463                                  August 17, 1965

William R. Ruby

It is hereby certified that error appears in the above numbered patent requiring correction and that the said Letters Patent should read as corrected below.

Column 2, line 56, for "(.628 mol)" read -- (.268 mol) -- column 3, line 64, for "14° C." read -- 134° C. --; column 4, line 54, for "50 c." read -- 50 cc. --; line 63, for "wield" read -- yield --.

Signed and sealed this 14th day of June 1966.

(SEAL)
Attest:

ERNEST W. SWIDER                              EDWARD J. BRENNER
Attesting Officer                                      Commissioner of Patents